June 15, 1926. 1,589,092

J. C. BAREFOOT

CUSHION SPRING

Filed Dec. 18, 1924

Inventor.
Josie C. Barefoot

By Lester L. Sargent
Attorney

Patented June 15, 1926.

1,589,092

UNITED STATES PATENT OFFICE.

JOSIE C. BAREFOOT, OF CHARLOTTE, NORTH CAROLINA.

CUSHION SPRING.

Application filed December 18, 1924. Serial No. 756,814.

The object of my invention is to provide an improved type of spring which will increase the efficiency of the conventional leaf spring which will prolong the life of the spring and tend to distribute the strains over a larger area, and which will also tend to prevent binding, sticking, rusting of the spring leaves, and eliminate the necessity for lubricating the springs.

I attain the object of my invention by the mechanism illustrated in the accompanying drawings, in which—

Like numerals designate like parts in each of the several views.

Figure 1:
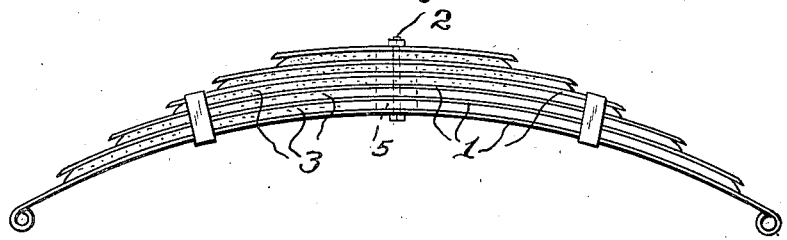
Figure 1 is a side elevation of my invention.
Figure 2:
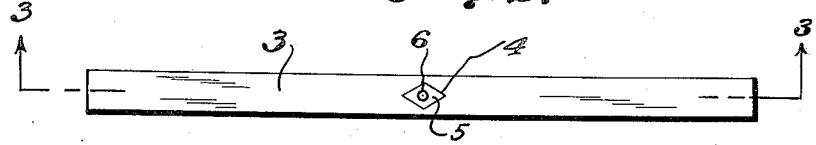
Fig. 2 is a plan view of one of the units including members 3 and 5.
Figure 3:
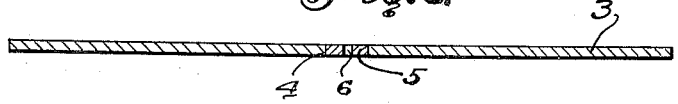
Fig. 3 is a longitudinal section on line 3—3 of Fig. 2.

Referring to the accompanying drawings, 1 designates the leaves of a conventional spring such as is used on vehicles. I provide a series of resilient strips, preferably of rubber, 3, having an opening 4 at the central portion thereof, in which is positioned a metal insert or block 5 which is provided with an aperture 6 through which the bolt 2 may be inserted. The arrangement of the rubber strips 3 spacing each metal spring leaf apart eliminates the necessity of lubrication, greatly increases the shock absorbing capacity of the leaf spring as a whole, and tends to distribute the strain over a larger area of the spring leaf, making the springs more elastic and retarding crystallization of the steel besides preventing sticking or rusting of the leaves. The metal blocks or inserts 5 prevent the weight of the vehicle from resting directly on the rubber cushions when the spring is not functioning, and the cost of the installation is small.

Figure 4:
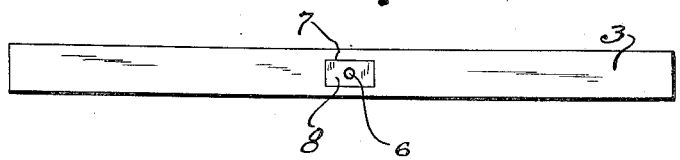
Fig. 4 is a plan view of a modification.
Figure 5:
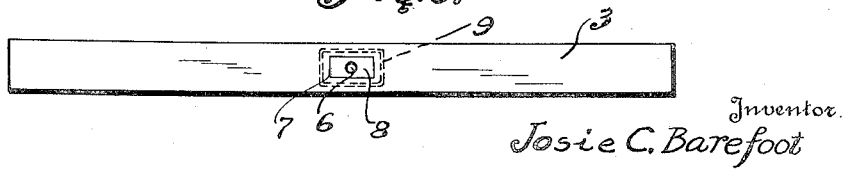
Fig. 5 is a plan view of a further modification.

I may provide rubber strips having a modified form of central opening 7, and a correspondingly shaped metal insert 8, as shown in Fig. 4. Or I may provide a rubber strip having reinforcing wire 9 vulcanized or otherwise suitably embedded in the rubber, as shown in Fig. 5.

What I claim is:

A cushion leaf spring comprising metal spring leaves, means for fastening the leaves together, a series of resilient strips inserted between successive leaves, metal inserts positioned in the central portion of the resilient strips, said inserts having apertures for a bolt to pass through, and a reinforcing wire embedded in each resilient strip and encircling the portion of the strip containing the metal insert.

JOSIE C. BAREFOOT.